Feb. 13, 1923.

A. J. McINTOSH.
VALVE GRINDER.
FILED SEPT. 24, 1920.

1,445,335.

INVENTOR.
A. J. McIntosh
by [signature]
attys.

Patented Feb. 13, 1923.

1,445,335

UNITED STATES PATENT OFFICE.

ALEXANDER J. McINTOSH, OF TORONTO, ONTARIO, CANADA.

VALVE GRINDER.

Application filed September 24, 1920. Serial No. 412,598.

*To all whom it may concern:*

Be it known that I, ALEXANDER JAMEISON MCINTOSH, a resident of the city of Toronto, in the county of York, in the Province of Ontario, Canada, have invented certain new and useful Improvements in Valve Grinders, of which the following is the specification.

My invention relates to improvements in valve grinders and the object of the invention is to devise a valve grinder which will produce an even surface on the valve and valve seat so as to prevent any leakage of compression when the valve is seated. A further object is to devise a valve grinder which will permit oscillatory movement being imparted to the valve and at the same time by further actuating the valve grinder permit interrupted circular movement being imparted to the valve.

My invention consists of a valve grinder constructed and arranged substantially as hereinafter more particularly described and illustrated in the accompanying drawings in which.

Like characters of reference indicate corresponding parts in the different views.

Figure 1:
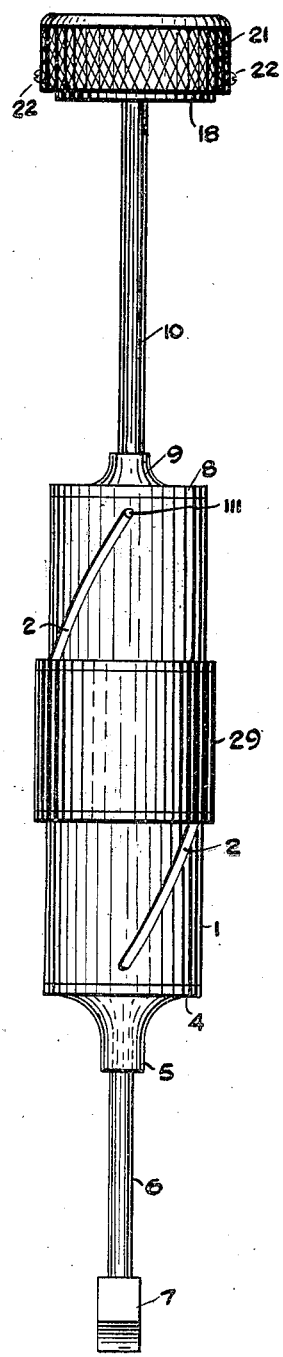
Fig. 1 represents an elevational view of a valve grinder constructed according to my invention.

1 is a hollow cylinder provided with a plurality of spiral grooves 2, each extending approximately half way round the cylinder and so situated that lines joining similar points will pass through the axis center of the hollow cylinder 1. 4 is a lower screw cap adapted to be threaded into the lower portion of the cylinder 1, said cap being provided with a depending shank 5 adapted to receive the upper end of the valve engaging member 6, such valve engaging member 6 being provided with a screw driver lower end or a pronged lower end 7, depending upon what type of valve is to be ground.

8 is an upper cap threaded into the upper end of the cylinder 1 and provided with an upwardly extending hollow boss 9. 10 is a tube extending through the cap and boss 8 and 9 respectively and provided on its lower end with a piston or plunger 11, said tube having a cross slot 12 therethrough in the vicinity of its lower end above the plunger 11. 111 are outwardly extending pins suitably secured to the plunger 11 and adapted to extend into the respective spiral grooves in the hollow cylinder 1.

13 is a disc portion suitably secured to the upper end of the tube 10 and carrying the clutch lever 14 fulcrumed on the bearing 15. 16 is a spiral spring adapted to engage the inner end of the clutch lever 14, such spring inserted into an indenture 17 in the upper surface of the disc portion. 18 is a collar surrounding the disc portion 13 and provided with the slots 19 in its upper surface, said slots being preferably situated at each quadrant of the circular collar.

20 is a collar retaining ring suitably secured to the disc portion, said collar retaining ring permitting the collar to freely rotate respectively to the disc portion. 21 is a cap extending over the disc portion 13 and collar 18 and suitably secured to the latter by the screws 22, said cap being suitably serrated on its outside surface to permit of its being readily gripped by the hand of the operator. 23 is a clutch actuating rod extending through the tube 10 and provided with the offset upper foot 24 adapted to engage the inner end of the lever 14.

25 is a lower offset foot adapted to extend through the slot 12 in the tube. 26 is a button seated in a cup-shaped indenture 27 in the top of the lower cylinder cap 4, and to permit the latter to rotate freely thereof. 28 is a spring inserted in the hollow cylinder 1, the lower end of said spring engaging the button 26 and the upper end the plunger 11. 29 is a collar freely mounted on the cylinder 1.

Figure 2:
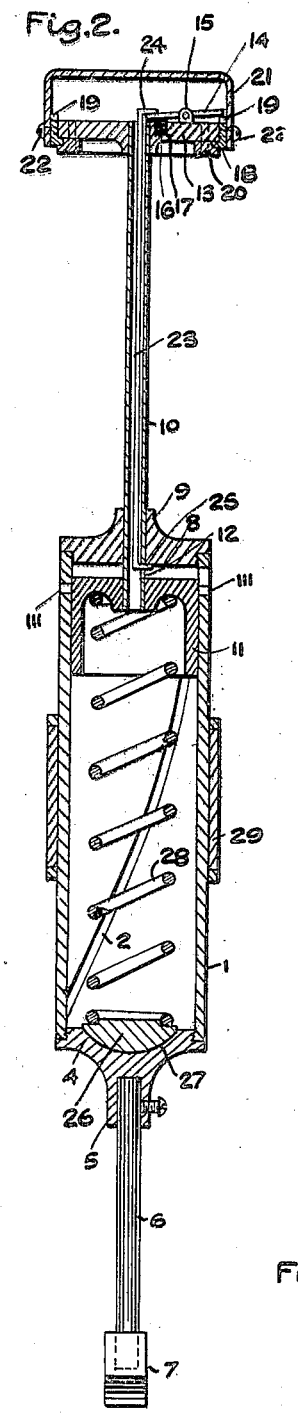
Fig. 2 is a vertical section therethrough.
Figure 3:
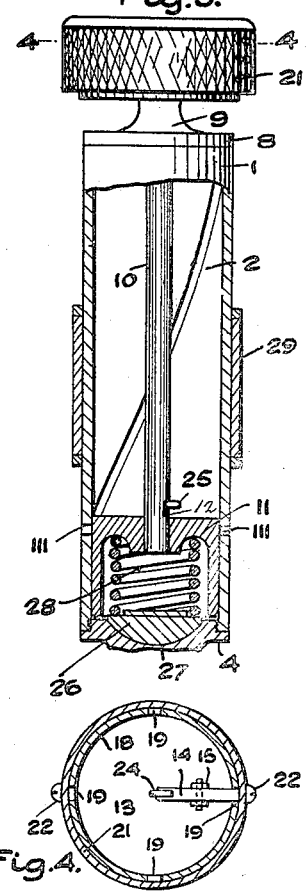
Fig. 3 is a vertical section through a portion of my valve grinder showing the upper portion compressed into the lower portion.
Figure 4:
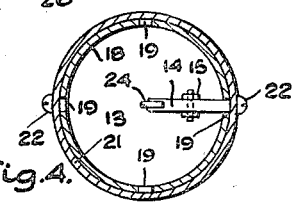
Fig. 4 is a cross sectional view through the line 4—4 Figure 3.

I will now describe the operation of my valve grinder shown in Figures 1 to 4.

The valve engaging member 6 is applied to the valve by inserting the screw driver end 7 in the slot in the head of the valve. The operator then grasps the collar 29 with one hand and the cap 21 with the other. By imparting a vertical reciprocatory motion to the cap 21 the tube 10 is caused to move up and down and with it the plunger 11. When this occurs the pins 111 slide in the groove 2 in the hollow cylinder 1 causing the same to be oscillated and thus imparting an oscillatory motion to the valve engaging member 6.

It will be understood in this instance that during this operation the plunger 11 is not allowed to reach the upper limit of its movement, the operator taking short strokes. By allowing the plunger 11 to reach the upper limit of its movement by permitting the spring 28 to be expanded by the operator relieving any pressure on the cap 21, the foot 24 of the rod 23 will engage the inner end of the lever 14 thus depressing the same against the spring 16 and allowing the outer end to be disengaged from the slot 19 in the collar 18.

By pressing down on the cap 21 again the whole device will be rotated about the cap for a quarter of a circle until the outer end of the lever 14 engages the next slot 19. This will consequently rotate the valve engaging member and engaged valve the quarter of a circle, when the operator, by taking short strokes, again imparts oscillatory motion to the valve. The above operations are carried out until the valve is completely ground.

In the form of valve grinder above described it will be seen that it is the hollow cylinder that rotates and oscillates and not the plunger or piston. Also the valve engaging tool is connected to the cylinder.

From the above description it will be seen that I have devised a simple and effective valve tool that will be simple in use and which can be used effectively by persons inexperienced in grinding valves.

While I describe my tool as being operated by hand it could with equal facility be operated by power.

What I claim as my invention is:

1. In a valve grinder, the combination with a valve engaging member, of means for oscillating said valve engaging member, said successive oscillations of the valve engaging member being equal and on the same arc and independent means for imparting progressive circular movement thereto.

2. In a valve grinder, the combination with a valve engaging member, of means for oscillating said valve engaging member, said successive oscillations of the valve engaging member being equal and on the same arc and independent means for automatically imparting interrupted progressive circular movement thereto.

3. In a valve grinder, the combination with a valve engaging member, of a rotatable element attached thereto, a reciprocable element coacting therewith, said reciprocable element upon being reciprocated oscillating the rotatable element, and means on the reciprocable member for imparting interrupted progressive circular movement to the rotatable element.

4. In a valve grinder, the combination with a valve engaging member, of a rotatable element attached thereto, a reciprocable element coacting therewith, said reciprocable element upon being reciprocated oscillating the rotatable element, and means on the reciprocable element for imparting interrupted progressive circular movement to the rotatable element upon the reciprocable element being permitted to reach the limit of its stroke.

5. In a valve grinder, the combination with a valve engaging member, of a rotatable element attached thereto, a reciprocable element coacting therewith, said reciprocable element upon being reciprocated oscillating the rotatable element and attached valve engaging member, a clutch on the reciprocable element, and means for tripping the clutch upon the reciprocable element reaching the limit of its stroke whereby on the commencement of the next stroke the rotatable member is rotated a part of a circle.

6. In a valve grinder, the combination with a valve engaging member, of a rotatable element attached thereto, a reciprocable element coacting therewith, said reciprocable element upon being reciprocated oscillating the rotatable element and attached valve engaging member, a clutch on the reciprocable element and a rod for tripping the clutch upon the reciprocable element reaching the limit of its stroke.

7. In a valve grinder, the combination with the oscillable valve engaging member, of a reciprocable member, coacting means between the reciprocable member and the oscillatable valve engaging member for causing the latter to oscillate within the confines of two fixed points and means for imparting interrupted, progressive, circular movement to the oscillatable valve engaging member.

A. J. McINTOSH, B. A.